US005796064A

United States Patent [19]

Rice et al.

[11] Patent Number: 5,796,064

[45] Date of Patent: Aug. 18, 1998

[54] METHOD AND APPARATUS FOR DUAL COAT THERMAL SPRAYING CYLINDRICAL BORES

[75] Inventors: Edwin E. Rice, Ann Arbor, Mich.; Walter C. Vliet, Columbia, N.J.

[73] Assignee: Ingersoll-Rand Company, Woodcliff Lake, N.J.

[21] Appl. No.: 739,347

[22] Filed: Oct. 29, 1996

[51] Int. Cl.[6] ........ B23K 9/04

[52] U.S. Cl. ........ 219/76.16; 219/76.15; 219/121.47

[58] Field of Search ........ 219/76.15, 76.14, 219/76.16, 121.47

[56] References Cited

U.S. PATENT DOCUMENTS

| | | | |
|---|---|---|---|
| 3,274,371 | 9/1966 | Manz et al. | 219/76.15 |
| 4,762,977 | 8/1988 | Browning | 219/121.47 |
| 4,788,402 | 11/1988 | Browning | 219/76.16 |
| 5,109,150 | 4/1992 | Rogers | 219/76.16 |
| 5,245,153 | 9/1993 | Singer et al. | 219/76.15 |
| 5,296,667 | 3/1994 | Marantz et al. | 219/121.47 |
| 5,321,224 | 6/1994 | Kamimura et al. | 219/76.15 |
| 5,442,153 | 8/1995 | Marantz et al. | 219/121.47 |
| 5,466,906 | 11/1995 | McCune, Jr. et al. | 219/76.16 |

*Primary Examiner*—Clifford C. Shaw
*Attorney, Agent, or Firm*—Walter C. Vliet

[57] ABSTRACT

Disclosed are a method and apparatus for coating the interior surface of a cylinder wherein separate consumable electrodes are fed to an arc formed between a rotating non-consumable electrode and directing an atomizing gas through the arc formed to carry the molten metal of the consumable electrode to the cylinder wall to coat the wall and wherein a first consumable electrode in introduced in the cylinder bore with a rotating thermal spray head and a second consumable electrode is introduced into the cylinder from an end opposite the rotating non-consumable electrode and wherein either or both consumable electrodes may be utilized to form deposits on the cylinder of mixed or alternative composition.

10 Claims, 2 Drawing Sheets

METHOD AND APPARATUS FOR DUAL COAT THERMAL SPRAYING CYLINDRICAL BORES

BACKGROUND OF THE INVENTION

This invention relates generally to thermal spraying of metallic coatings and more particularly to thermal spraying cylindrical bores for automotive engines and the like.

In production applications involving thermal spraying of coatings it is often desirable to apply, for example, a base or bond coating of one material followed by a second top coating of another material. In the case of internal coating of cylinder bores, for example, this application would require a change of bore coating thermal spray guns and/or additional indexing of the cylinder block resulting in lost production and possible loss of coating quality. The application has additional disadvantages for production multi-pass thermal spraying guns working in a cylindrical bore where the gun rotates around a coaxially fed wire feed.

The foregoing illustrates limitations or disadvantages known to exist in present devices and methods. Thus, it is apparent that it would be advantageous to provide an alternative directed to overcoming one or more of the limitations or disadvantages set forth above. Accordingly, a suitable alternative is provided including features more fully disclosed hereinafter.

SUMMARY OF THE INVENTION

In one aspect of the present invention the purpose of the invention is accomplished by providing an improved method and apparatus for thermal spraying cylindrical bores comprising a method of thermal spraying a material onto an internal cylindrical surface of a cylinder having a cylindrical axis using an arc spraying process with a plurality of consumable electrodes and a non-consumable electrode, wherein the non-consumable electrode and a first consumable electrode are introduced into the cylinder from one open end and the non-consumable electrode is rotated within the cylinder about the cylindrical axis but offset therefrom as well as being linearly translated along the cylindrical axis, the first consumable electrode being fed into and maintained in arc striking distance with the non-consumable electrode in a first operating function and maintained at a non arc striking distance in a second operating function; a second consumable electrode being fed into and maintained in arc striking distance from the non-consumable electrode from the opposite open end of the cylinder in the second operating function; an arc being struck between one of the first and the second consumable electrode and the non-consumable electrode and atomizing gas being directed past the arc formed across the first cylindrical axis to atomize molten material from one of the first and the second consumable electrode in the arc and carry it towards and deposit it on the inner cylindrical surface.

Disclosed also is an apparatus for thermal spraying cylindrical bores comprising a thermal arc spray head including a non-consumable electrode disposed for rotation about and translation essentially along a central axis of a cylindrical bore; the thermal arc spray head being inserted into the cylindrical bore from one open end of the cylindrical bore and rotated about an axis of spray head rotation; a first consumable electrode insertable into the cylindrical bore along the central axis within the thermal spray head to an arc striking distance of the non-consumable electrode; a second consumable electrode being inserted from an opposite open end of the cylindrical bore along the axis of spray head rotation to within arc striking distance from the non-consumable electrode; means for thereafter synchronizing the translation of the first and second electrodes consumable and the non-consumable electrode in a selected arc sustaining relationship; and means associated with the non-consumable electrode for directing an atomizing gas past an arc formed and across the axis of spray head rotation to atomize molten material from the consumable electrode in the arc and carry it towards and deposit it on the inner cylindrical surface.

The foregoing and other aspects will become apparent from the following detailed description of the invention when considered in conjunction with the accompanying drawing figures.

BRIEF DESCRIPTION OF THE DRAWING FIGURES

FIG. 1 is a partially sectioned elevation view of a thermal spraying apparatus including two feed wires with one cathode spray head according to the present invention shown in the process of coating the interior cylinder bore of an engine; and FIG. 2 is a partially sectioned elevation of a portion of a thermal spraying head including two feed wires and two cathode spray heads in one unit.

DETAILED DESCRIPTION

Figure 1:
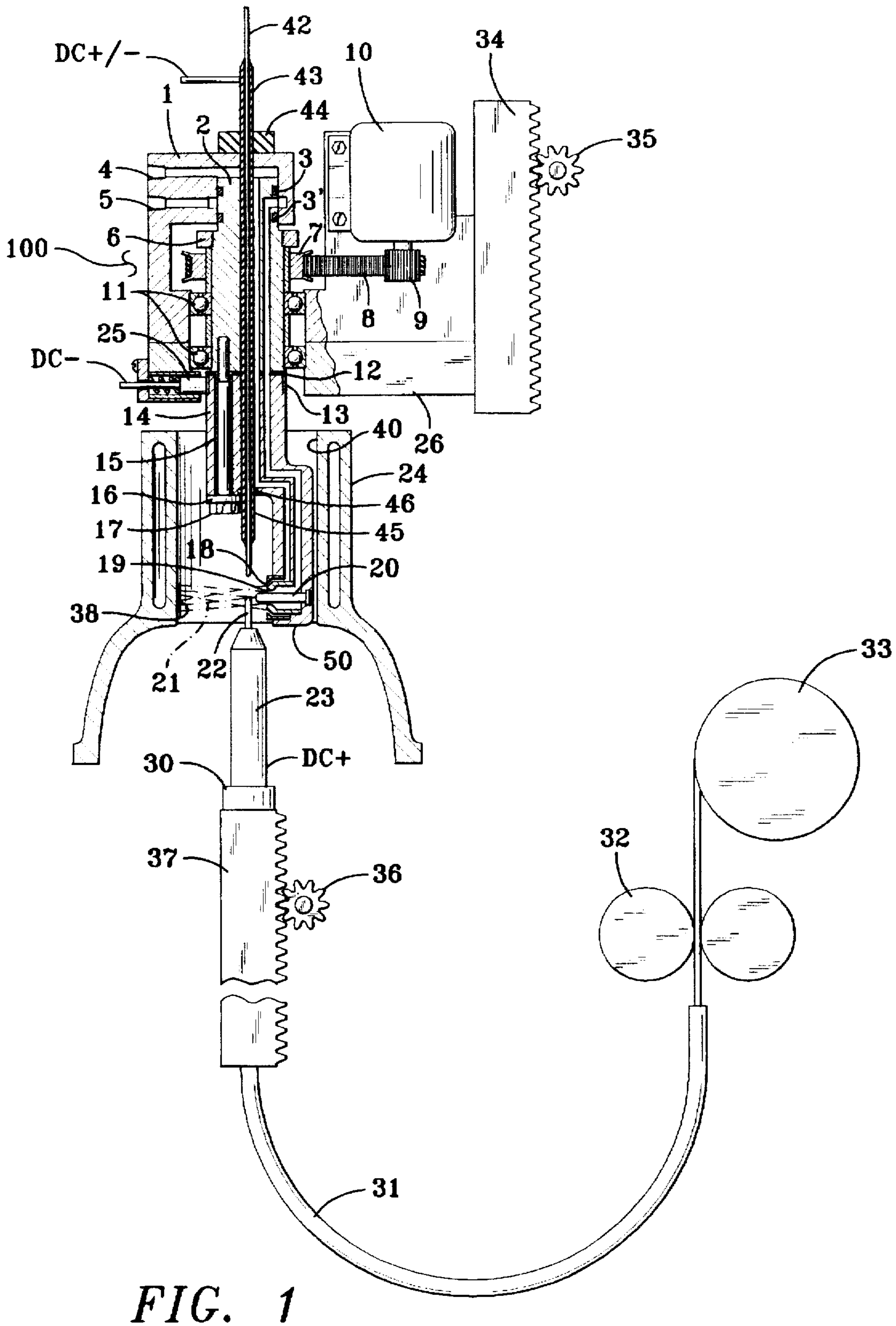

Referring to FIG. 1 an arc spraying device according to the present invention is generally shown and indicated by the reference numeral 100. The arc spray unit is composed of an upper gun body 1 with an internal bore into which is disposed an upper spindle for rotation therein. The upper gun body has a supply port 4 for one process gas and a supply port 5 for a second process gas. The first one process gas is dispensed through the upper spindle 2 and the lower spindle 14 through an internal bore exiting at annular nozzle 18 for the one process gas. The second process gas entering through supply port 5 is distributed through an internal bore in the upper spindle 2 and lower spindle 14 and exits through annular nozzle 19 for the second process gas.

The upper spindle 2 is supported for rotation within the upper gun body 1 by means of a pair of spindle bearings 11 which permit the spindle to rotate within the gun body. A spindle nut 6 positions and retains a driven cog belt pulley 7 which drives the spindles 2 and 14 in rotation. The driven cog belt pulley is in turn driven by a cog belt 8 and a drive motor cog belt pulley 9 which receives its rotational input from motor 10. Rotation seal 3 and 3' isolate the first and second process gas components.

The lower spindle 14 is electrically isolated from the upper spindle 2 by means of lower spindle electrical insulator 12, insulating sleeve 15, for the attachment bolt 17 and insulating washer 16 also for the attachment bolt 17. This permits the lower spindle 14 to be electrically isolated and connected to DC supply voltage (supply not shown) through slip ring 13 and contact brush assembly 25. This provides a negative potential or cathode potential to non-consumable electrode 20. The lower spindle 14 is shown disposed for rotation within the cylinder bore 40 of an engine block 24. The lower spindle rotates about the centerline of the cylinder bore as indicated in FIG. 1.

According to the present invention a first feed wire or first consumable electrode 42 (obtainable from a wire reel and feed wire driving rolls similar to the wire reel 33 and driving rolls 32, later described) is fed through wire guide and electrical contact 43 and is impressed with a positive or anode voltage required to form an arc between the anode 22 and the cathode 20 utilizing configurations well known in metal arc spaying technology. The electrode 42 passes through an insulated sheath 45 which is secured to the upper gun body 1 by means of seal support 44. The sheath 45 is passed through a clearance hole within the upper spindle 2 and the lower spindle 14 which permits the spindle to rotate about the sheath 45. A sliding contact seal 46 in the form of a contained "O" ring seals the loss of process gas. In this manner the first consumable electrode 42 is isolated electrically from the gun body 1 and spindles 2, 14, and may be fed from a spool (not shown) to within arc striking distance when desired.

According to the present invention a second feed wire or consumable electrode 22 is fed through wire guide and electrical contact 23 and is impressed with the positive or anode voltage required to form an atomizing arc between the anode and the cathode. Although we have chosen to depict a gas shielded arc spray process for purposes of the preferred embodiment, it should be understood that any plasma arc or transferred arc spraying process, for example, might be utilized for production of the atomized molten metal or thermal spray material 21 which is to be deposited as a coating 38 on the cylinder wall 40.

In addition to rotation of the lower spindle 14, which contains the annular nozzles 18 and 19 for directing the thermal spray 21 onto the cylinder walls 40 where it is deposited as a uniform metal coating, it is also necessary to translate the nozzles axially within the cylinder bore as shown in FIG. 1. To accomplish this, the lower gun body which is attached to the upper gun body 1 and the lower spindle 14 are shown supported on a gun mounting apparatus 26 which produces an axial movement through gear rack 34 and pinion drive for the gear rack 35.

As the gun mount 26 is moved axially, it carries with it the gun body 1 and lower spindle 14. Wire from feed wire reel 33 is fed through feed wire driving rolls 32 through the feed wire flexible conduit 31 to the feed wire guide 23 as a supply of wire to be deposited.

Wire feed guide and electrical contact 23 is independent and simultaneously driven by means of a separate servo drive gear 36 and rack 37 or similar servo or differential mechanical mounting such as a piston actuator. In operation, the arc spray process is started with the spray head 50 withdrawn from the cylinder block 24 by means of pinion 35 and rack 34 and the feed wire guide and electrical contact 23 withdrawn from the bottom of the engine block 24 by the independent servo pinion and rack 36,37. In this position the block 24 may be moved between the spray head 50 and the feed wire guide 23 and positioned to the centerline of a cylinder to be coated.

At this point the spray head 50 and the feed wire guide 23 may be moved into the operating juxtapose position from opposite ends of the cylinder and the spray process started by rotation of the spindle 2,14 which in turn rotates the spray head 50 about the feed wire electrode. The supply of process gas through supply ports 4 and 5 is initiated and upon electrical energization of the anode and cathode and establishing an arc between them, the spray process is begun. The spray head cathode and the feed wire guide are positioned at approximately 90 degrees from one another and are displaced axially in the cylinder bore simultaneous during the coating process to complete the coating of the interior of the cylinder wall. This is accomplished by the rack and pinion 34,35 in simultaneous conjunction with rack and pinion 36,37.

Figure 2:
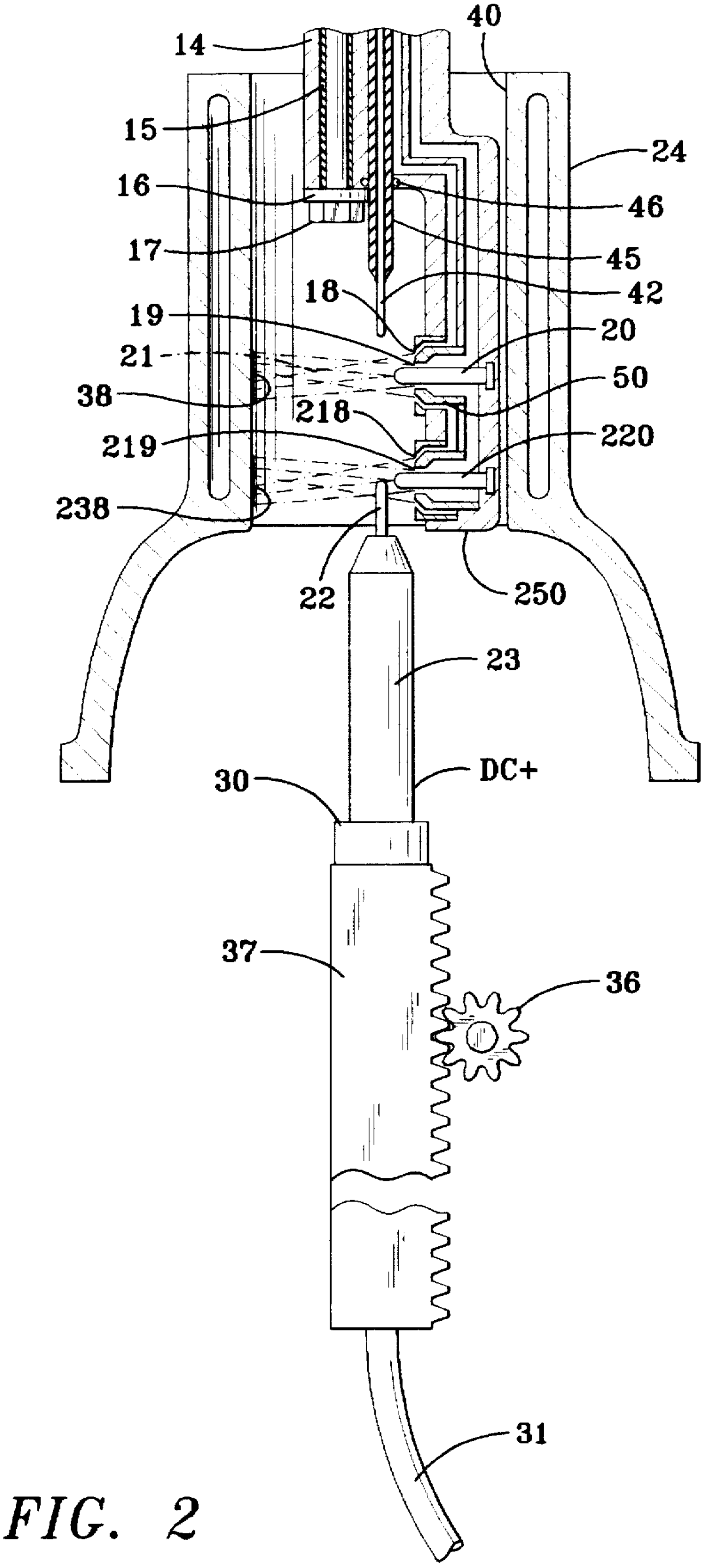

Referring to FIG. 2 a modification of the rotation lower spindle permits a second cathode spray head 250 to be utilized in conjunction with the second or lower feed wire anode. As in the case of the first cathode spray head 50 the second spray head 250 is provided with a first process gas exiting at nozzle 218 and a second gas exiting at nozzle 219. A cathode 220 is provided with a similar negative potential as cathode 20. Melted feed wire for anode 22 is propelled by the process gas exiting nozzle 218 and 219 across the cylinder direction to form a second coating area 238 on the cylinder wall in the manner previously described.

Further, in operation according to the present invention, a two wire system is possible feeding one consumable electrode wire from the top and one consumable electrode wire from the bottom. The arc can be maintained between the consumable wires depending on the impressed polarity of the applied voltage or between either one or both of the consumable wires and the non-consumable cathode. With the capability of individually feeding the consumable wires to the arc area and using, for example, a solid state switching arrangement (not shown) to impress the appropriate voltage polarity, it now becomes possible to spray two different alloys, either at one time to form a mixture, or sequentially to form a first and second alloy coating, for example, a base coat and a top coat in subsequent passes of the thermal spray gun as it is reciprocated longitudinally through the length of the cylinder and simultaneously rotated to apply the coating. The wire feed and current control for each wire would be individually selectable.

The bond coat may be sprayed during a first actual pass to the cylinder bore and the top coat sprayed during the following pass to the cylinder bore, therefore making it possible to double coat the interior of the cylinder wall in an efficient single reciprocating pass suitable for high volume production. Another possible variation is to simultaneously feed both feed wires to increase the deposition rate. In still another arrangement it is possible to use two cathodes embedded in two nozzles, as for example shown in the FIG. 2 embodiment. With two nozzles used in close spacing to each other with one cathode for each of the two feed wires, it is possible to increase the deposition rate over a single wire and would offer bond and top coat in one axial pass through the cylinder bore. The two gun nozzles would be sequenced individually at the start and stop of axial travel in the bore to minimize overspray. The two gun nozzles could be focused so that the spray patterns are nearly overlapping with the top coat being applied over a still hot bond coat layer. In some applications this would improve top coat adhesion. Deposition rates for each material being sprayed may be separately regulated by controlling current and wire feed rate.

Although we have shown an arc spraying device for use with the present invention, it should be understood that with the included provision of the two process gases it is possible to readily modify the arc unit to a transferred arc plasma torch as, for example, disclosed by U.S. Pat. No. 4,762,977.

Upon completion of the coating process the spray head 50 and the feed wire guide 23 are moved apart and in the same manner as they were moved together and the engine block 24 is indexed to the next cylinder or removed.

Having described our invention in terms of a preferred embodiment, numerous other alternatives will occur to one skilled in the art. We do not wish to be limited in the scope of our invention except as claimed.

What is claimed is:

1. A method of thermal spraying a material onto an internal cylindrical surface of a cylinder having a first cylindrical axis comprising:

an arc spraying process with a plurality of consumable electrode and a non-consumable electrode, wherein said non-consumable electrode and a first consumable electrode are introduced into the cylinder from one open end and said non-consumable electrode is rotated within the cylinder about the cylindrical axis but offset therefrom as well as being linearly translated along the cylindrical axis, said first consumable electrode being fed into and maintained in arc striking distance with said non-consumable electrode in a first operating function and maintained at a non arc striking distance in a second operating function;

a second consumable electrode being fed into and maintained in arc striking distance from the non-consumable electrode from the opposite open end of the cylinder in said second operating function;

an arc being struck between one of said first and said second consumable electrode and said non-consumable electrode and atomizing gas being directed past the arc formed across the first cylindrical axis to atomize molten material from one of said first and said second consumable electrode in the arc and carry it towards and deposit it on the inner cylindrical surface.

2. A method of thermal spraying according to claim 1 wherein:

said non-consumable electrode is part of a transferred arc plasma torch assembly which is inserted in said cylindrical bore after said cylindrical bore is positioned transversely to a cylindrical axis position in line with a rotating centerline of said torch.

3. A method of thermal spraying according to claim 1 wherein:

said first and second consumable electrodes are inserted in said cylindrical bore along said cylindrical axis after said cylindrical bore is positioned transversely to a cylindrical axis position in line with a rotating centerline of said torch.

4. An apparatus for thermal spraying cylindrical bores comprising:

a thermal arc spray head including a non-consumable electrode disposed for rotation about and translation essentially along a central axis of a cylindrical bore; the thermal arc spray head being inserted into the cylindrical bore from one open end of the cylindrical bore and rotated about an axis of spray head rotation; a first consumable electrode insertable into said cylindrical bore along said central axis within said thermal spray head to an arc striking distance of said non-consumable electrode; a second consumable electrode being inserted from an opposite open end of the cylindrical bore along the axis of spray head rotation to within arc striking distance from the non-consumable electrode; means for thereafter synchronizing the translation of the first and second consumable electrodes and the non-consumable electrode in a selected arc sustaining relationship; and means associated with the non-consumable electrode for directing an atomizing gas past an arc formed and across the axis of spray head rotation to atomize molten material from the consumable electrode in the arc and carry it towards and deposit it on the inner cylindrical surface.

5. An apparatus for thermal spraying cylindrical bores according to claim 4 wherein:

said thermal arc spray head is a transferred arc plasma torch assembly containing said non-consumable electrode.

6. An apparatus for thermal spraying cylindrical bores according to claim 4 wherein:

said thermal arc spray head and said first consumable electrode are mounted on a common reciprocating carrier and are axially aligned.

7. An apparatus for thermal spraying cylindrical bores according to claim 4 wherein:

said thermal arc spray head and said second consumable electrode are mounted on coordinated servo means for alternatively moving said thermal arc spray head and said second consumable electrode together and apart or coordinated together to reciprocate within said cylindrical bore.

8. An apparatus for thermal spraying cylindrical bores according to claim 4 further comprising a means for moving said cylindrical bore transversely to a position of alignment of the central axis of the cylindrical bore with a rotating axis of said thermal arc spray head.

9. An apparatus for thermal spraying cylindrical bores according to claim 4, wherein:

said cylindrical bore is a piston bore in an internal combustion engine block.

10. An apparatus for thermal spraying cylindrical bores according to claim 4 wherein said thermal arc spray head is further provided with a second means for directing an atomizing gas past a second arc formed between a second non-consumable electrode and a second consumable electrode and across the central axis to atomize molten material for said second consumable electrode in the second arc and carry it towards and deposit it on a second portion of the inner cylindrical surface of said cylinder bore.

* * * * *